US010503525B2

(12) United States Patent
Kohn

(10) Patent No.: US 10,503,525 B2
(45) Date of Patent: Dec. 10, 2019

(54) APPARATUSES, METHODS AND SYSTEMS FOR PERSISTING VALUES IN A COMPUTING ENVIRONMENT

(71) Applicant: Thomson Reuters Global Resources Unlimited Company, Baar (CH)

(72) Inventor: David Kohn, Hamilton, NJ (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 41 days.

(21) Appl. No.: 15/683,330

(22) Filed: Aug. 22, 2017

(65) Prior Publication Data

US 2019/0065216 A1 Feb. 28, 2019

(51) Int. Cl.
| | | |
|---|---|---|
| *G06F 9/46* | (2006.01) | |
| *G06F 9/448* | (2018.01) | |
| *G06F 16/23* | (2019.01) | |
| *G06F 8/20* | (2018.01) | |
| *G06F 9/445* | (2018.01) | |
| G06F 16/27 | (2019.01) | |
| G06F 16/174 | (2019.01) | |
| G06F 16/13 | (2019.01) | |

(52) U.S. Cl.
CPC .............. *G06F 9/4493* (2018.02); *G06F 8/24* (2013.01); *G06F 9/44521* (2013.01); *G06F 16/2365* (2019.01); *G06F 16/13* (2019.01); *G06F 16/1756* (2019.01); *G06F 16/27* (2019.01)

(58) Field of Classification Search
CPC .... G06F 9/465; G06F 17/30286; G06Q 10/10
USPC .................................. 719/315; 707/790, 803
See application file for complete search history.

(56) References Cited

U.S. PATENT DOCUMENTS

| | | |
|---|---|---|
| 6,061,520 A | 5/2000 | Yellin et al. |
| RE38,104 E | 4/2003 | Gosling |
| 6,766,324 B2 | 7/2004 | Carlson et al. |
| 7,024,656 B1 | 4/2006 | Ahad |
| 9,141,415 B2 | 9/2015 | Rasmussen et al. |
| 9,507,607 B2 | 11/2016 | Iordanov |

(Continued)

OTHER PUBLICATIONS

EPO. International Search Report and Written Opinion dated Feb. 12, 2019, for related counterpart International Application No. PCT/IB2018/001036, 11 pages.

(Continued)

*Primary Examiner* — Andy Ho
(74) *Attorney, Agent, or Firm* — Winthrop & Weinstine, P.A.

(57) ABSTRACT

The present disclosure is directed to persisting values in a computing environment, particularly using computer programs that are configured to run on a virtual machine. An illustrative method includes first launching a computer program, preferably within the environment of a virtual machine. The method further includes loading a plurality of classes associated with the computer program into memory by way of a specially configured class loader. This class loader is configured to scan at least one class of classes loaded into memory for at least one persistence-annotated field within that class. The specially configured class loader is further configured to write byte code into a class that contains the at least one persistence-annotated field. The byte code that is added to the class is configured to cause a first object that is later instantiated from the at least one class to have the persistence-annotated field.

23 Claims, 6 Drawing Sheets

(56) References Cited

U.S. PATENT DOCUMENTS

| | | |
|---|---|---|
| 2003/0056022 A1 | 3/2003 | Carlson et al. |
| 2006/0136373 A1 | 6/2006 | Beust et al. |
| 2014/0331118 A1* | 11/2014 | Helm .................... G06F 9/4493 715/234 |
| 2014/0337276 A1 | 11/2014 | Iordanov |

OTHER PUBLICATIONS

Laurent Daynes et al. "Sharing the Runtime Representation of Classes Across Class Loaders." In: ECOOP 2005—Object-Oriented Programming, Springer-Verlag, 2005, pp. 97-120.

* cited by examiner

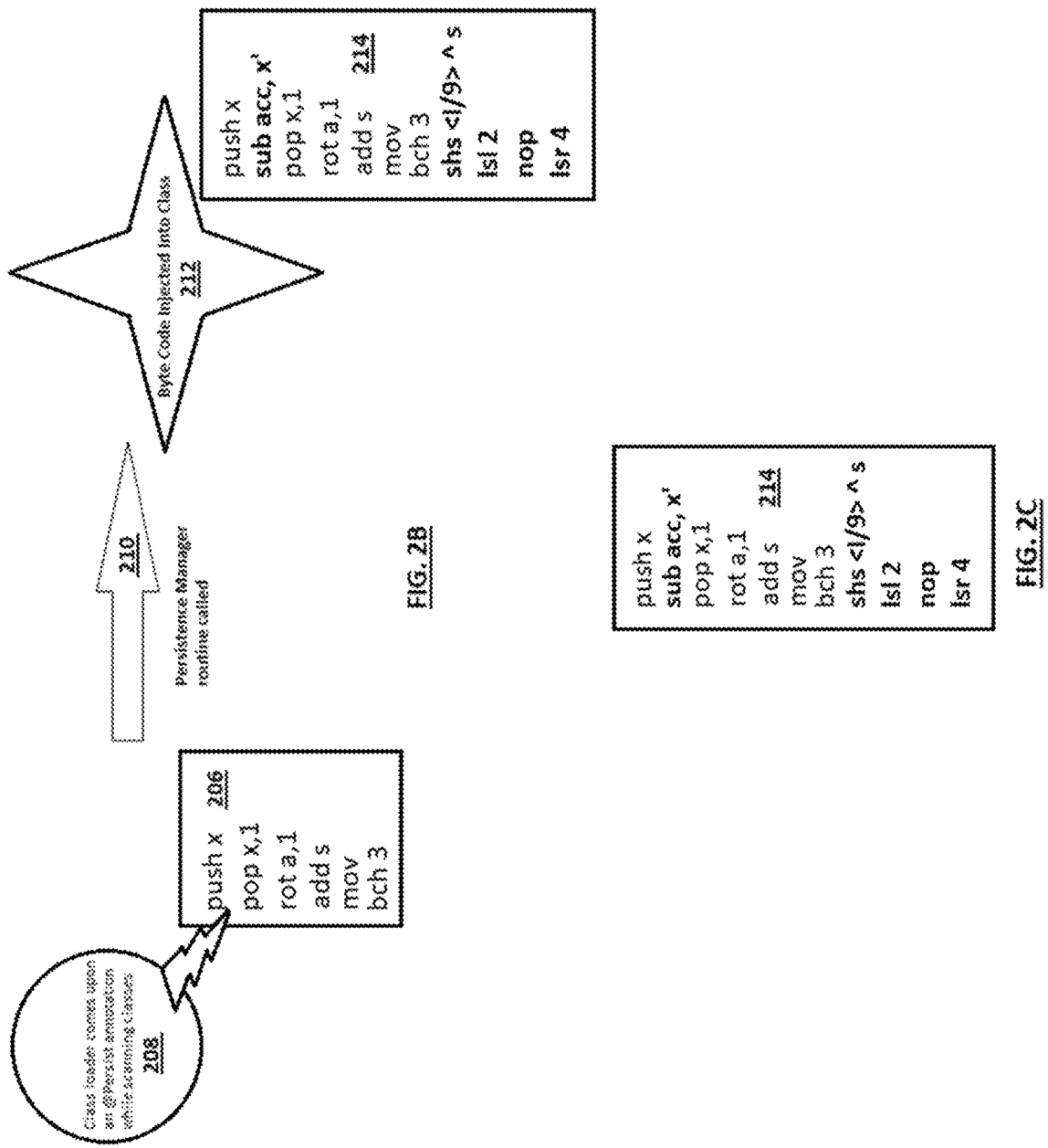

```
@Persist( fieldname = Example.name )
String name;

public class Example(){
    String arg0 = "Fred";
    setName( arg0 );
};

public void setName( String x ){
    name = x;
    PersistenceManager.fieldChanged( "Example.name", name );
};
```

FIG. 2D

```
class PersistenceManager{ private static Preferences dataStore;

public static void fieldChanged( String key, String value ){
        dataStore.put( key, value );
    };

APPARATUSES, METHODS AND SYSTEMS FOR PERSISTING VALUES IN A COMPUTING ENVIRONMENT

This application for letters patent discloses and describes various novel innovations and inventive aspects of graph database analysis technology (hereinafter "disclosure") and contains material that is subject to copyright, mask work, or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for persisting values in a computing environment. As such, the present innovations include (at least) the following distinct area, including:

a software program development tool (with a suggested Class/Subclass of 717/100, 106 and 108).

However, in order to develop a reader's understanding of the innovations, descriptions have been compiled into a single disclosure to illustrate and clarify how aspects of these innovations operate independently, interoperate as between individual innovations, or cooperate collectively. The application goes on to further describe the interrelations and synergies as between the various innovations; all of which is to further comply with 35 U.S.C. § 112.

BACKGROUND

In the development of computer programs for end users, persistence of values of fields is almost universally necessary. However, in creating such programs, designating fields for which values must be persisted is extremely labor intensive. The presently disclosed embodiments provide solutions to these, and other problems in the art.

SUMMARY

Advantages of the present disclosure will be set forth in and become apparent from the description that follows. Additional advantages of the disclosure will be realized and attained by the methods and systems particularly pointed out in the written description and claims hereof, as well as from the appended drawings.

The present disclosure is directed to a simple, developer-centric means to persist data of interest in situ at the point in the code that is being written, without the need for any specific configuration on the developer's part aside from a one-time change to the application launch setup. Advantageously, there is no external dependency on frameworks such as Hibernate® or its service overhead, and it substantially reduces the workload of the developer.

Thus, in accordance with some implementations, the disclosure provides methods, apparatuses and computer programs for persisting values in a computing environment. An illustrative method includes first launching a computer program, preferably within the environment of a virtual machine, such as a Java® virtual machine ("JVM"). The method further includes loading a plurality of classes associated with the computer program into memory by way of a specially configured class loader. This class loader is configured to scan at least one class of classes loaded into memory for at least one persistence-annotated field within that class. The persistence-annotated field includes an annotation indicating that a data value associated with the annotated field is to be persisted. The specially configured class loader is further configured to write byte code into the class that contains the at least one persistence-annotated field. This byte code that is added to the class is configured to cause a first object that is later instantiated from the at least one class to have the persistence-annotated field, as discussed further herein below. The method also can thus include instantiating the first object including the at least one persistence-annotated field.

In some implementations, the method can further include observing a change in a value of the persistence-annotated field in the first object. In response to this observation of change in value of the persistence-annotated field, a persistence manager object can be notified of the change of the value of the persistence-annotated field in the first object. The method can further include storing an updated value of the persistence-annotated field in a data store associated with the persistence manager object, wherein the persistence manager object stores the updated value in the data store. For example, the first object can be configured to call a function in the persistence manager object to update the value of the persistence-annotated field in the data store. In a preferred implementation, the persistence manager object is instantiated the first time that the value of the at least one persistence-annotated field changes. In various implementations, the persistence manager object uses the persistence annotation as a key in a key value pair storing the updated value of the persistence-annotated field in the data store, wherein the updated value of the persistence-annotated field is used as the value in the key value pair. The data store is a map, for example, or any other suitable data store.

The method can further include writing out the value of the persistence-annotated field stored in the map. The value can written out in any desired manner, such as to a database, stream, hard drive, network drive, cloud drive, and the like.

In some implementations, the computer program can be a Java® Virtual Machine compliant computer program being executed from within a first running Java® Virtual Machine instance. In other implementations, the computer program can be a Visual C# ® computer program or a Python® computer program being executed from within a virtual machine in memory. In still other implementations, the computer program can be a Kotlin® computer program, Groovy™ computer program, or a Clojure™ computer program being executed from within a virtual machine in memory.

The disclosure further provides an apparatus including a plurality of circuit modules, computer memory, and at least one processor configured and arranged to persist values in a computing environment. The circuit modules include a first circuit module configured and arranged to launch a computer program, and a second circuit module configured and arranged to load a plurality of classes associated with the computer program into memory by way of a specially configured class loader. The specially configured class loader is programmed to modify the code in at least one class having a persistence annotation in the plurality of classes by scanning the at least one class of the plurality of classes loaded into memory for at least one persistence-annotated field within the at least one class. The at least one persistence-annotated field has an annotation indicating that a data value associated with the annotated field is to be persisted. The specially configured class loader further acts to write byte code into at least one of the classes containing the at least one persistence-annotated field. This byte code causes a first object instantiated from the at least one class to have the at least one persistence-annotated field therein. The apparatus further includes a third circuit module configured and arranged to instantiate the first object including the at least one persistence-annotated field.

In some implementations of the apparatus, the first object can be configured to notify a persistence manager object of a change of the value of the persistence-annotated field(s) in the first object. The persistence manager object can be programmed to store an updated value of the persistence-annotated field(s) in a data store associated with the persistence manager object. The persistence manager object can be instantiated in response to the first object calling a function to notify the persistence manager. The persistence manager object can be configured to use the persistence annotation as a key in a key value pair storing the updated value of the persistence-annotated field in the data store. The updated value of the persistence-annotated field can be used as the value in the key value pair. The data store is a map, or any other suitable data store.

The disclosure further provides a processor-readable tangible non-transient medium storing a computer program for operating a system for persisting values in a computing environment. The computer program includes instructions for launching a computer program, preferably from within a running instance of a virtual machine, such as a Java® virtual machine. The computer program further includes instructions for loading a plurality of classes associated with the computer program into memory by way of a class loader. The instructions configure the class loader being configured to scan at least one class of the plurality of classes loaded into memory for at least one persistence-annotated field within the at least one class. The at least one persistence-annotated field includes an annotation indicating that a data value associated with the annotated field is to be persisted. The instructions further configure the class loader to write byte code into the at least one class containing the at least one persistence-annotated field. The byte code causes a first object instantiated from the at least one class to have the at least one persistence-annotated field therein. The computer program further includes instructions for instantiating the first object including the at least one persistence-annotated field.

In some implementations, the computer program can be configured such that the first object is instructed to notify a persistence manager object of a change of the value of the at least one persistence-annotated field in the first object. The persistence manager object can be instructed to store an updated value of the at least one persistence-annotated field in a data store associated with the persistence manager object. The persistence manager object can be instantiated in response to the first object calling a function to notify the persistence manager. The persistence manager object is instructed to use the persistence annotation as a key in a key value pair storing the updated value of the persistence-annotated field in the data store. The updated value of the persistence-annotated field can be used as the value in the key value pair. The wherein the data store can be a map, or any other suitable data store.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIG. 2B shows a @Persist annotation found in a class being loaded by a class loader in accordance with the disclosure, resulting in a modified class being generated in place of the original class.

FIG. 2C illustrates the modified class that is then loaded in place of the original class.

FIG. 2D presents an illustrative example of decompiled modified byte code in accordance with the present disclosure.

FIG. 2E presents an illustrative Persistence Manager implementation in accordance with the disclosure.

DETAILED DESCRIPTION

Figure 1:
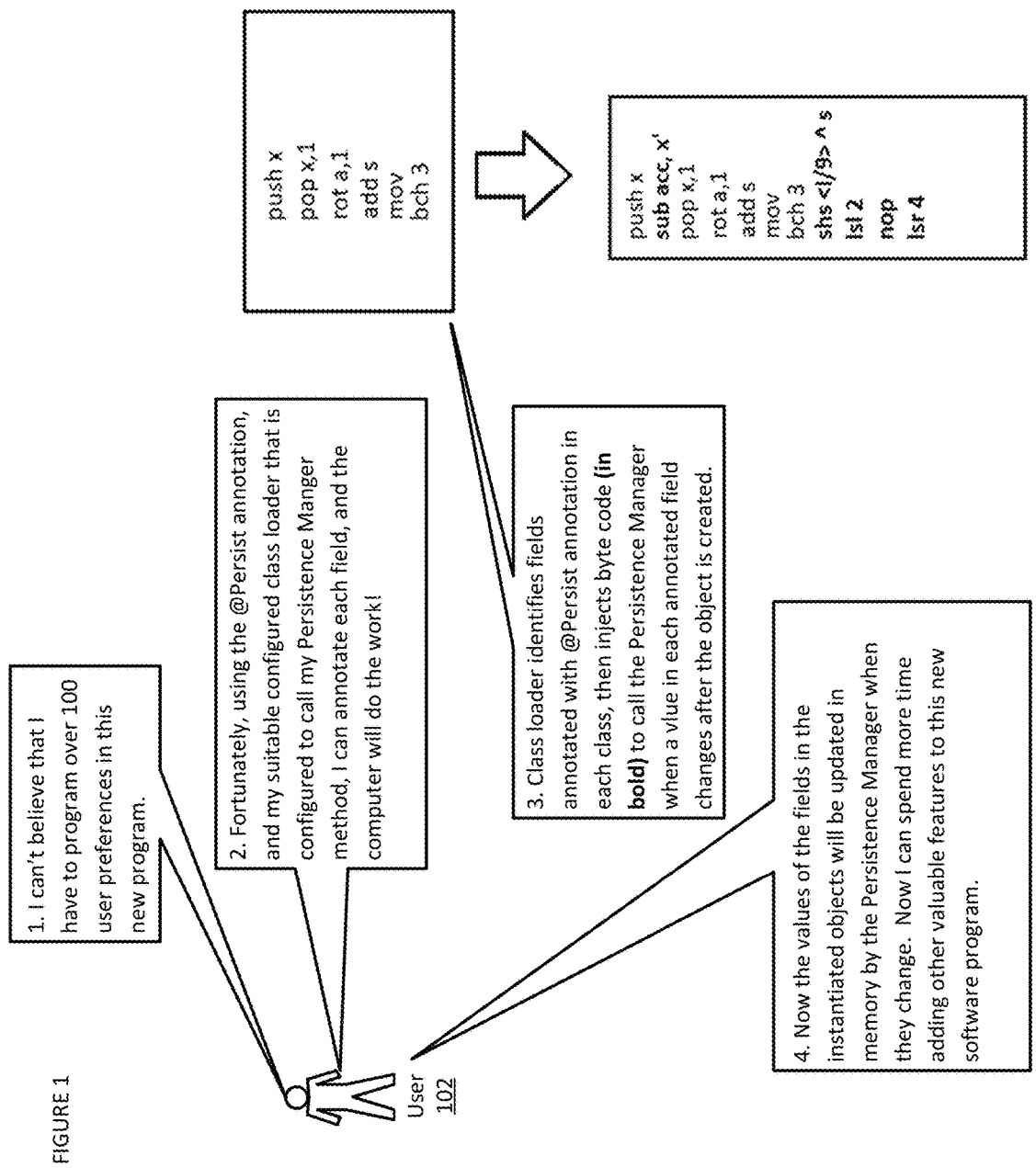
FIG. 1 shows an exemplary usage scenario in one embodiment of a system in accordance with the disclosure.

Reference will now be made in detail to the present preferred embodiments of the disclosure, examples of which are illustrated in the accompanying drawings.

The methods and corresponding steps of the disclosed embodiments will be described in conjunction with the detailed description of the system.

As set forth above, the disclosed embodiments provide improvements in developing computer programs for developers, particularly with respect to persisting values in fields.

As an illustrative, non-limiting example, one of the most common, necessary, and laborious tasks an application developer faces is the persistence of user preferences. Myriad choices are presented in the options, preferences, tools, etc. in any number of applications. Each of the checkboxes, dropdown boxes, and other various interactive widgets need to be created by the developer, and in operation, the computer program must monitor their values, store those values somewhere, retrieve them when needed, and set back onto the original user interface components.

In accordance with the embodiments of the present disclosure, it is possible to provide a simple, scalable, and efficient means for a Java® application developer (or developer using other similar programming languages) to persist values in a data-store-agnostic way. As described herein, Java refers to the Java programming language as invented by James Gosling of Sun Microsystems.

To persist a value refers to a non-specific mechanism whereby a data point can be stored in some fashion after the application which created it ends its execution. Persistence often refers to the whole process whereby said data point can be stored and then retrieved at some later time after the original application is restarted. An example of this would be a document such as one being created in an application such as Microsoft Word®. A user can work on such a document over the course of multiple sessions, with changes persisted between each.

Unlike the most notable persistence frameworks on the market, both commercial and open-source, embodiments in accordance with the present disclosure require a bare minimum of setup and use on the part of the developer. To illustrate the effort previously required in persisting a value, consider the example of storing user preferences, such as a person's first name, last name, title, and the date using Hibernate®. First, a Java® program is provided:

```
public class PersistOjectWithHibernate {
    private SessionFactory sessionFactory;
    private Employee employee;
    public PersistOjectWithHibernate( ) {
        sessionFactory = new Configuration( ).configure( ).buildSessionFactory( );
        Session session = sessionFactory.getCurrentSession( );
        employee = new Employee( );
        employee.setName("Jack");
        employee.setSurname("Thomson");
        employee.setTitle("QA Engineer");
        employee.setCreated(new Date( ));
        try {
            session.beginTransaction( );
            session.save(employee);
            session.getTransaction( ).commit( );
        }
        catch (HibernateException e) {
            e.printStackTrace( );
            session.getTransaction( ).rollback( );
        }
    }
}
```

Next, the developer needs to create the Hibernate® XML configuration file which configures Hibernate and tells Hibernate that we intend to persist an Employee record:

```
<?xml version='1.0' encoding='utf-8'?>
<!DOCTYPE hibernate-configuration PUBLIC
 "-//Hibernate/Hibernate Configuration DTD 3.0//EN"
 "http://hibernate.sourceforge.net/hibernate-configuration-3.0.dtd">
<hibernate-configuration>
  <session-factory>
    <property name="connection.driver_class">com.mysql.jdbc.Driver</property>
    <property name="connection.url">jdbc:mysql://localhost/companydb</property>
    <property name="connection.username">jcg</property>
    <property name="connection.password">jcg</property>
    <property name="connection.pool_size">5</property>
    <property name="dialect">org.hibernate.dialect.MySQLDialect</property>
    <property name="current_session_context_class">thread</property>
    <property name="cache.provider_class">org.hibernate.cache.NoCacheProvider</property>
    <property name="show_sql">true</property>
    <property name="format_sql">true</property>
    <property name="hbm2ddl.auto">update</property>
    <mapping resource="Employee.hbm.xml" />
  </session-factory>
</hibernate-configuration>
```

Next, the developer must define and instruct Hibernate® how to store the employee data points mentioned earlier with this XML:

```
<?xml version="1.0"?>
<!DOCTYPE hibernate-mapping PUBLIC
 "-//Hibernate/Hibernate Mapping DTD 3.0//EN"
 "http://hibernate.sourceforge.net/hibernate-mapping-3.0.dtd">
<hibernate-mapping>
  <class name="com.javacodegeeks.snippets.enterprise.Employee" table="employee">
   <id name="id" column="id">
   <generator class="native"/>
   </id>
   <property name="name" not-null="true" length="50" />
   <property name="surname" not-null="true" length="50" />
   <property name="title" length="50" />
   <property name="created" type="timestamp" />
  </class>
</hibernate-mapping>
```

As can be appreciated, the foregoing is rather complicated.

For purposes of illustration, and not limitation, FIG. 1 shows an exemplary usage scenario in one embodiment of the disclosure. In FIG. 1, a program developer 102 may utilize an embodiment of the disclosed system to persist values in fields in a software program that the developer is creating. To cause a value in a field of interest to be persisted, the developer adds an "@Persist" annotation to classes having values to be persisted. When the class loader then begins loading classes, the class loader scans for the @Persist annotation in each class being loaded into memory. The class loader then injects customized byte code into each class, so that when an object or objects are instantiated with respect to each class having the @Persist annotation, every time the value in the field changes, it is automatically updated by the persistence manager, discussed in further detail below.

A detailed illustrative example of one implementation in accordance with the disclosure is provided in FIGS. 2A-2E.

Figure 2A:
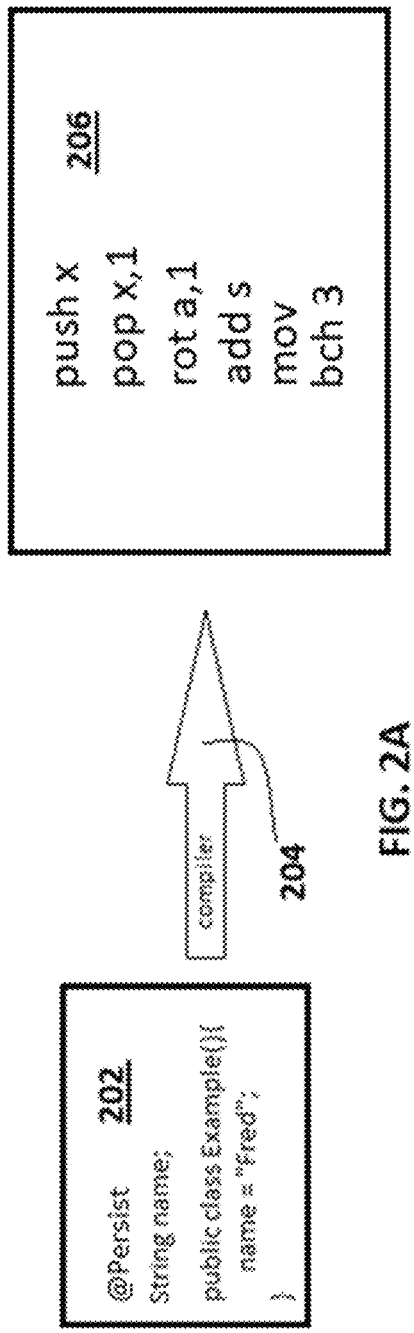
FIG. 2A shows an example of Java® source code compiled to byte code.

For purposes of illustration, and not limitation, with reference to FIG. 2A, an example of Java® source code 202 is compiled via a compiler 204 into byte code in a class 206. The developer (e.g., 102), or other user, programs the @Persist annotation into fields in the class 206 that they wish to be persisted in accordance with the present disclosure in support of developing an application using the Java® or other programming language as discussed herein below.

In further accordance with the illustrative method, the developer or other user then launches a computer program, preferably within the environment of a virtual machine, such as a Java® virtual machine ("JVM"). Thus, in some implementations, the computer program can be a Java® Virtual Machine compliant computer program being executed from within a first running Java® Virtual Machine instance. In other implementations, the computer program can be a Visual C# ® computer program or a Python® computer program being executed from within a virtual machine in memory. In still other implementations, the computer program can be a Kotlin® computer program, Groovy™ computer program, or a Clojure™ computer program being executed from within a virtual machine in memory.

FIG. 2B shows a @Persist annotation found in a class being loaded by a class loader in accordance with the disclosure, resulting in a modified class being generated in place of the original class. In an illustrative example, a plurality of classes (e.g., 206) associated with the computer program into memory by way of a specially configured class loader 208. This class loader 208 is configured to scan at least one class of classes 206 loaded into memory for at least one persistence-annotated field within that class. As illustrated, the persistence-annotated field includes an annotation indicating that a data value associated with the annotated field is to be persisted within the class.

The specially configured class loader 208 is further configured to write byte code into the class 206 that contains the at least one persistence-annotated field, resulting in a modified class 214 being generated in place of the original class 206. This byte code that is added to the class is configured to cause a first object that is later instantiated from the class 214 to have the persistence-annotated field. As illustrated in FIGS. 2B-2C, a Persistence Manager class 210 is called. The Persistence Manager class 210 contains instructions for injecting byte code 212 into the class 206 to create the modified class.

The method also can thus include instantiating the first object including the at least one persistence-annotated field. The object is instantiated in accordance with the instructions provided in the modified class 214. Once in existence, the first object created from modified class 214 includes one or more variables having values to be persisted. When the value of one of the variables changes in the first object, the first object is configured to notify a Persistence Manager Object created using instructions from the Persistence Manager class 210 that the value of the variable has changed. For example, the first object can be configured to call a function in the persistence manager object to update the value of the persistence-annotated field in the data store. The Persistence Manager object is accordingly configured to take the information concerning the new value of the variable, and place it in a data store, such as a map. In various embodiments, the Peristence Manager object can be instantiated in response to the first instance in which the first object calls for the Persistence Manager object in response to the change in value of the field. In various implementations, the persistence manager object uses the persistence annotation as a key in a key value pair storing the updated value of the persistence-annotated field in the data store, wherein the updated value of the persistence-annotated field is used as the value in the key value pair. The method can further include writing out the value of the persistence-annotated field stored in the map. The value can written out in any desired manner, such as to a database, stream, hard drive, network drive, cloud drive, and the like.

Recall the earlier example of an embodiment of a method in which values are persisted using Hibernate, XML, and the like. The same result of persistence can be obtained using the below code in accordance with the present disclosure:

```
public class PersistObjectWithHibernate {
    private SessionFactory sessionFactory;
    @Persist( fieldname = "PersistOjectWithHibernate.employee" )
    private Employee employee;
    public PersistOjectWithHibernate( ) }
        sessionFactory = new
Configuration( ).configure( ).buildSessionFactory( );
        Session session = sessionFactory.getCurrentSession( );
        employee = new Employee( );
        employee.setName("Jack");
        employee.setSurname("Thomson");
        employee.setTitle("QA Engineer");
        employee.setCreated(new Date( ));
    }
}
```

As can be seen, the developer (e.g., 102) has little to do to persist an object when using embodiments in accordance with the present disclosure because the labor has been shifted off of the developer, and onto the software. FIG. 2D presents an illustrative example of decompiled modified byte code in accordance with the present disclosure, whereas FIG. 2E presents an illustrative Persistence Manager implementation in accordance with the disclosure. As is plainly evident, the disclosed example is far simpler and easier to implement than the prior art approach using Hibernate, XML and the like.

Thus, in accordance with the present disclosure, the developer's work is greatly reduced to that of creating the user interface widget (i.e.: a checkbox), then placing a bit of metadata, called an annotation, near the field (variable) in the source code that stores the value for the widget. Using manipulation of bytecode (e.g., Java® bytecode), the onus of point-of-use data persistence is shifted off the shoulders of the developer and onto embodiments of the present disclosure. Since development time is significantly reduced using the disclosed embodiments, an increased number of new features and enhancements to existing features can be realized. Also, a reduction in the number of software defects attributable to the current complexity of data persistence will also translate into more man-hours available for new and enhanced features.

Figure 3:
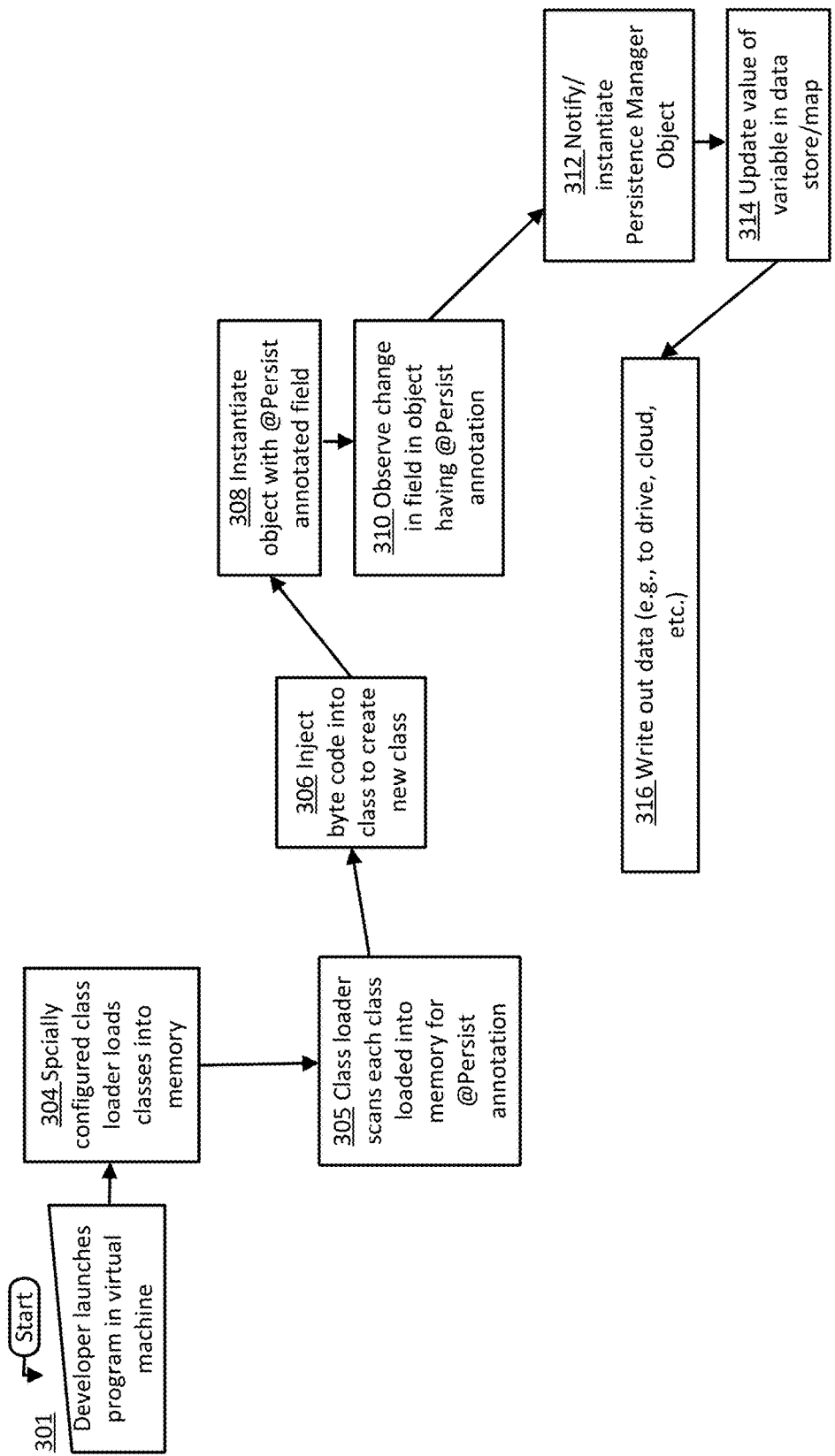
FIG. 3 shows a logic flow diagram illustrating aspects of the system in one embodiment of the present disclosure.

FIG. 3 presents an example of a logic/data flow diagram that illustrates a particular implementation of a method and system in accordance with the present disclosure. While logical elements and steps are presented, it will be appreciated that each actually corresponds to an appropriately programmed circuit module that is configured to execute the logic and move data from one component to another, as instructed by machine readable code that is being executed. The logical steps are separated that take place within or with respect to a machine of a user (client device), an analytics platform (server) and a graph database, wherein the devices are delimited from each other by dashed lines. Data flows from one device to another are represented by arrows crossing the dashed lines.

As illustrated in FIG. 3, an illustrative example begins at step 301 with a user, such as a developer 102, launching a computer program, preferably within the environment of a virtual machine, such as a Java® virtual machine ("JVM"). The method further includes loading a plurality of classes associated with the computer program into memory at step 304 by way of a specially configured class loader (e.g., 208). This class loader is configured to scan at least one class (e.g., 206) of classes loaded into memory at step 305 of the computer for at least one @Persistence-annotated field within that class. The persistence-annotated field includes an annotation (such as @Persistance) indicating that a data value associated with the annotated field is to be persisted. At step 306, the specially configured class loader is further configured to write byte code into the class that contains the at least one persistence-annotated field, such as be calling a method by calling a Persistence Class. This byte code that is added to the class is configured to cause a first object that is later instantiated from the at least one class to have the persistence-annotated field at step 308.

In some implementations, the method can further include observing a change in a value of the persistence-annotated field in the first object at step 310. In response to this observation of change in value of the persistence-annotated field, a persistence manager object can be notified of the change of the value of the persistence-annotated field in the first object at step 312. The method can further include storing an updated value of the persistence-annotated field in a data store associated with the persistence manager object at step 314, wherein the persistence manager object stores the updated value in the data store. The method can further include writing out the value of the persistence-annotated field stored in the map at step 316. The value can written out in any desired manner, such as to a database, stream, hard drive, network drive, cloud drive, and the like.

Detailed Description of the Coordinator

Figure 4:
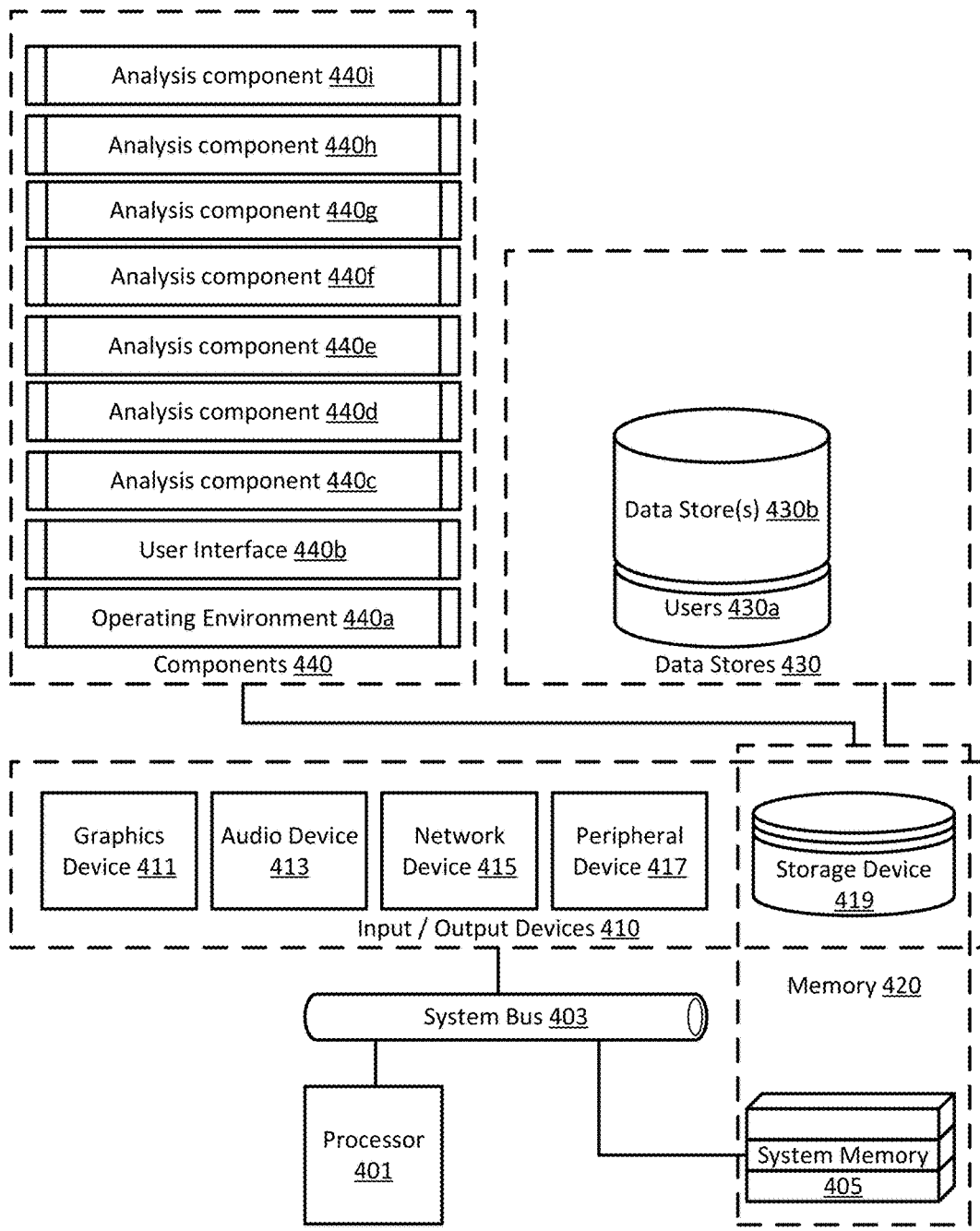
FIG. 4 shows a block diagram illustrating an exemplary system coordinator in one embodiment of the disclosure.

FIG. 4 shows a block diagram illustrating an exemplary coordinator in one embodiment of the disclosed embodiments. The coordinator facilitates the operation of the disclosed embodiments via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the coordinator may comprise a standalone computer system, a distributed computer system, a node in a computer network (i.e., a network of computer systems organized in a topology), a network of coordinators, and/or the like. It is to be understood that the coordinator and/or the various coordinator elements (e.g., processor, system bus, memory, input/output devices) may be organized in any number of ways (i.e., using any number and configuration of computer systems, computer networks, nodes, coordinator elements, and/or the like) to facilitate operation. Furthermore, it is to be understood that the various coordinator computer systems, coordinator computer networks, coordinator nodes, coordinator elements, and/or the like may communicate among each other in any number of ways to facilitate operation. As used in this disclosure, the term "user" refers generally to people and/or computer systems that interact with the; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; outside of the context of a graph database the term "node" refers generally to a server, to a client, and/or to an intermediary computer system, program, and/or a combination thereof that facilitates transmission of and/or handling of requests and/or responses.

The coordinator includes a processor 401 that executes program instructions. In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 405 via a system bus 403. The system bus may interconnect these and/or other elements of the coordinator via electrical, electronic, optical, wireless, and/or the like communication links (e.g., the system bus may be integrated into a motherboard that interconnects coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices 410 may be connected to the processor and/or to the system memory, and/or to one another via the system bus.

In some embodiments, the input/output devices may include one or more graphics devices 411. The processor may make use of the one or more graphic devices in accordance with program instructions executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data. A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 413. The processor may make use of the one or more audio devices in accordance with program instructions executed by the processor. In one implementation, an audio device may be a sound card that may obtain (e.g., via a connected microphone), process, output (e.g., via connected speakers), and/or the like audio data. A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 415. The processor may make use of the one or more network devices in accordance with program instructions executed by the processor. In one implementation, a network device may be a network card that may obtain (e.g., via a Category 5 Ethernet cable), process, output (e.g., via a wireless antenna), and/or the like network data. A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 417. The processor may make use of the one or more peripheral devices in accordance with program instructions executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the coordinator with a variety of input, output and processing capabilities.

In some embodiments, the input/output devices may include one or more storage devices 419. The processor may access, read from, write to, store in, erase, modify, and/or the like a storage device in accordance with program instructions executed by the processor. A storage device may facilitate accessing, storing, retrieving, modifying, deleting, and/or the like data (e.g., graph database data as described elsewhere herein) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 405 and the one or more storage devices 419 may be referred to as memory 420 (i.e., physical memory).

Memory 420 contains processor-operable (e.g., accessible) data stores 430. Data stores 430 comprise data that may be used via the coordinator. Such data may be organized using one or more data formats such as one or more of a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, coordinator elements, and/or the like) to facilitate operation. For example, data stores may comprise data stores 430*a-n* implemented as one or more (e.g., graph) databases. A users data store 430*a* may be a collection of database tables that include fields such as UserID, UserName, UserPreferences, and/or the like. A graph database data store 430*b* may be a collection of graph databases.

System memory 420 contains processor-operable (e.g., executable) components 440. Components 440 comprise program components (including program instructions and any associated data stores) that are executed via the coordinator (i.e., via the processor) to transform inputs into outputs. It is to be understood that the various components and their subcomponents, capabilities, applications, and/or the like may be organized in any number of ways (i.e., using any number and configuration of components, subcomponents, capabilities, applications, coordinator elements, and/or the like) to facilitate operation. Furthermore, it is to be understood that the various components and their subcomponents, capabilities, applications, and/or the like may communicate among each other in any number of ways to facilitate operation. For example, the various components and their subcomponents, capabilities, applications, and/or the like may be combined, integrated, consolidated, split up, distributed, and/or the like in any number of ways to facilitate operation. In another example, a single or multiple instances of the various components and their subcomponents, capabilities, applications, and/or the like may be instantiated on each of a single coordinator node, across multiple coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 440 may include an operating environment component 440*a*. The operating environment component may facilitate operation of the system via various subcomponents. In some implementations, the operating environment component may include an operating system subcomponent. The operating system subcomponent may provide an abstraction layer that facilitates the use of, communication among, common services for, interaction with, security of, and/or the like of various coordinator elements, components, data stores, and/or the like.

In some embodiments, the operating system subcomponent may facilitate execution of program instructions by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the system. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the system by providing user interface elements that may be used by the system to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Microsoft Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate capabilities such as storage, analysis, retrieval, access, modification, deletion, aggregation, generation, and/or the like of data (e.g., the use of data stores 1130). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, and/or the like.

In some implementations, the operating environment component may include an information handling subcomponent. The information handling subcomponent may provide the system with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, system components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 1130) via the database subcomponent.

In some embodiments, the information handling subcomponent may facilitate presentation of information obtained from users, system components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate system message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, a custom protocol, and/or the like to facilitate system message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates system security. In some embodiments, the security subcomponent may restrict access to the system, to one or more services provided by the system, to data associated with the system (e.g., stored in data stores 430), to communication messages associated with the system, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the system may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates system virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 440 may include a user interface component 440b. The user interface component may facilitate user interaction with the system by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In order to address various issues and advance the art, the entirety of this application (including the Cover Page, Title, Headings, Field, Background, Summary, Brief Description of the Drawings, Detailed Description, Claims, Abstract, Figures, Appendices or otherwise) shows by way of illustration various embodiments in which the claimed innovations may be practiced. The advantages and features of the application are of a representative sample of embodiments only, and are not exhaustive or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural or topological modifications may be made without departing from the scope or spirit of the disclosure. As such, all examples or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical or topological structure of any combination of any program components (a component collection), other components or any present feature sets as described in the figures or throughout are not limited to a fixed operating order or arrangement, but rather, any disclosed order is exemplary and all equivalents, regardless of order, are contemplated by the disclosure. Furthermore, it is to be understood that such features are not limited to serial execution, but rather, any number of threads, processes, services, servers, or the like that may execute asynchronously, concurrently, in parallel, simultaneously, synchronously, or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, or the like thereof. As such, it should be understood that advantages, embodiments, examples, functional, features, logical, operational, organizational, structural, topological, or other aspects of the disclosure are not to be considered limitations on the disclosure as defined by the claims or limitations on equivalents to the claims.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of circuitry and method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, among other things, provide for improved data analysis methods, systems and machine readable programs for carrying out the same. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A method for persisting values in a computing environment, comprising:
   launching a computer program;
   loading a plurality of classes associated with the computer program into memory via processor by way of a class loader that is configured to:
      scan at least one class of said plurality of classes loaded into memory via processor for at least one persistence-annotated field within said at least one class, said at least one persistence-annotated field having a persistence annotation indicating that a data value associated with the annotated field is to be persisted;
      write byte code into said at least one class containing said at least one persistence-annotated field via processor, said byte code causing a first object instantiated from said at least one class to have said at least one persistence-annotated field therein; and
   instantiating said first object including said at least one persistence-annotated field.

2. The method of claim 1, further comprising:
   observing a change in a value of said at least one persistence-annotated field in said first object; and
   notifying a persistence manager object of the change of the value of said at least one persistence-annotated field in said first object; and
   storing an updated value of the persistence-annotated field in a data store associated with the persistence manager object.

3. The method of claim 2, wherein the persistence manager object is instantiated the first time that the value of said at least one persistence-annotated field changes.

4. The method of claim 2, wherein the first object calls a function in the persistence manager object to update the value of the persistence-annotated field in the data store.

5. The method of claim 4, wherein the persistence manager object uses the persistence annotation as a key in a key value pair storing the updated value of the persistence-annotated field in the data store, and further wherein the updated value of the persistence-annotated field is used as the value in the key value pair.

6. The method of claim 2, wherein the data store is a map.

7. The method of claim 6, further comprising writing out the value of the persistence-annotated field stored in the map.

8. The method of claim 7, wherein the value is written to a database.

9. The method of claim 1, wherein the computer program is a Java Virtual Machine compliant computer program being executed from within a first running Java Virtual Machine instance.

10. The method of claim 1, wherein the computer program is a Visual C#® computer program or a Python® computer program being executed from within a virtual machine in memory.

11. The method of claim 1, wherein the computer program is a Kotlin® computer program, Groovy™ computer program, or a Clojure™ computer program being executed from within a virtual machine in memory.

12. An apparatus comprising a plurality of circuit modules, computer memory, and at least one processor configured and arranged to persist values in a computing environment, the circuit modules including:
   a first circuit module configured and arranged to launch a computer program;

a second circuit module configured and arranged to load a plurality of classes associated with the computer program into memory by way of a class loader for modifying the code within at least one class of said plurality of classes having a persistence annotated field by:

scanning said at least one class of said plurality of classes loaded into memory for at least one persistence-annotated field within said at least one class, said at least one persistence-annotated field having a persistence annotation indicating that a data value associated with the annotated field is to be persisted;

writing byte code into said at least one class containing said at least one persistence-annotated field, said byte code causing a first object instantiated from said at least one class to have said at least one persistence-annotated field therein; and a third circuit module configured and arranged to instantiate said first object including said at least one persistence-annotated field.

13. The apparatus of claim 12, wherein the first object is configured to notify a persistence manager object of a change of the value of said at least one persistence-annotated field in said first object.

14. The apparatus of claim 13, wherein said persistence manager object stores an updated value of said at least one persistence-annotated field in a data store associated with said persistence manager object.

15. The apparatus of claim 14, wherein said persistence manager object is instantiated in response to the first object calling a function to notify the persistence manager.

16. The apparatus of claim 15, wherein the persistence manager object is configured to use the persistence annotation as a key in a key value pair storing the updated value of the persistence-annotated field in the data store, and further wherein the updated value of the persistence-annotated field is used as the value in the key value pair.

17. The apparatus of claim 14, wherein the data store is a map.

18. A processor-readable tangible non-transient medium storing a computer program for operating a system for persisting values in a computing environment, wherein the computer program comprises:

instructions for launching a computer application;

instructions for loading a plurality of classes associated with the computer application into memory by way of a class loader, said class loader being configured to:

scan at least one class of said plurality of classes loaded into memory for at least one persistence-annotated field within said at least one class, said at least one persistence-annotated field having a persistence annotation indicating that a data value associated with the annotated field is to be persisted;

write byte code into said at least one class containing said at least one persistence-annotated field, said byte code causing a first object instantiated from said at least one class to have said at least one persistence-annotated field therein; and instructions for instantiating said first object including said at least one persistence-annotated field.

19. The processor-readable tangible non-transient medium of claim 18, wherein the first object is instructed to notify a persistence manager object of a change of the value of said at least one persistence-annotated field in said first object.

20. The processor-readable tangible non-transient medium of claim 19, wherein said persistence manager object is instructed to store an updated value of said at least one persistence-annotated field in a data store associated with said persistence manager object.

21. The processor-readable tangible non-transient medium of claim 20, wherein said persistence manager object is instructed to be instantiated in response to the first object calling a function to notify the persistence manager object.

22. The processor-readable tangible non-transient medium of claim 21, wherein the persistence manager object is instructed to use the persistence annotation as a key in a key value pair storing the updated value of the persistence-annotated field in the data store, and further wherein the updated value of the persistence-annotated field is used as the value in the key value pair.

23. The processor-readable tangible non-transient medium of claim 20, wherein the data store is a map.

* * * * *